US009814188B2

(12) United States Patent
Almudhyan

(10) Patent No.: US 9,814,188 B2
(45) Date of Patent: Nov. 14, 2017

(54) TREE TRUNK HOUSING AND ADJUSTABLE TARP WATER-SAVING DEVICE

(71) Applicant: Mudhyan Khalid Almudhyan, Corvallis, OR (US)

(72) Inventor: Mudhyan Khalid Almudhyan, Corvallis, OR (US)

( * ) Notice: Subject to any disclaimer, the term of this patent is extended or adjusted under 35 U.S.C. 154(b) by 129 days.

(21) Appl. No.: 14/661,560

(22) Filed: Mar. 18, 2015

(65) Prior Publication Data

US 2016/0270306 A1 Sep. 22, 2016

(51) Int. Cl.
*A01G 13/00* (2006.01)
*A01G 13/10* (2006.01)
*A01G 27/02* (2006.01)

(52) U.S. Cl.
CPC ............. *A01G 13/10* (2013.01); *A01G 27/02* (2013.01)

(58) Field of Classification Search
CPC ................ A01K 13/02; A01K 13/0237; A01K 13/0243; A01K 13/00; A01K 13/10; A01K 13/0281; A01G 13/02; A01G 13/0237; A01G 13/0243; A01G 13/00; A01G 13/10; A01G 13/0281
USPC .......... 47/2, 21.1, 20.1, 23.3, 25, 29, 30, 32, 47/32.4, 32.5, 48.5
See application file for complete search history.

(56) References Cited

U.S. PATENT DOCUMENTS

| | | | |
|---|---|---|---|
| 4,642,938 A * | 2/1987 | Georges | A01G 13/0281 47/2 |
| 4,651,465 A | 3/1987 | Lilly | |
| 4,700,507 A * | 10/1987 | Allen | A01G 13/0243 47/32.4 |
| 5,117,582 A * | 6/1992 | Cissel, Jr. | A01G 23/04 47/21.1 |
| 5,878,528 A | 3/1999 | Pattyn | |
| 6,385,900 B1 * | 5/2002 | George | A01G 29/00 47/40.5 |
| 6,705,044 B2 * | 3/2004 | Clancey | A01G 13/0281 47/31.1 |
| 7,013,597 B1 * | 3/2006 | Dominguez | A01G 13/0212 47/31.1 |
| 7,082,716 B2 * | 8/2006 | Downey | A01G 25/02 239/273 |
| D542,709 S * | 5/2007 | Barker | D11/164 |
| D549,403 S * | 8/2007 | Ohman | D30/142 |
| 7,941,966 B2 * | 5/2011 | Foix Robert | A01G 13/0237 47/20.1 |
| 8,296,995 B1 * | 10/2012 | Georges | A01G 13/0243 47/20.1 |
| 8,683,741 B2 * | 4/2014 | Castagno | A01G 13/043 206/423 |
| 8,881,450 B2 | 11/2014 | Essafi | |
| 9,215,945 B2 * | 12/2015 | PeCoy | A47G 33/04 |

(Continued)

*Primary Examiner* — Monica Williams
*Assistant Examiner* — Aaron Rodzwicz
(74) *Attorney, Agent, or Firm* — Oblon, McClelland, Maier & Neustadt, L.L.P.

(57) ABSTRACT

A water-saving device comprising a hollow frusto-conical housing having a wide lower end adapted to overlie a ground surface and a narrow upper end. A flexible tarp is integrally connected around the circumference of the narrow upper end of the housing, and a draw string is integrally attached around the circumference of a upper end of the flexible tarp. The draw string is pulled taught to reduce the circumference of the upper end of the flexible tarp and enclose the tarp around the tree trunk.

18 Claims, 3 Drawing Sheets

(56) References Cited

U.S. PATENT DOCUMENTS

| | | | |
|---|---|---|---|
| 2002/0095861 A1* | 7/2002 | Trussell | A01G 13/0268 47/1.01 R |
| 2006/0283079 A1* | 12/2006 | McGough | A01G 27/006 47/48.5 |
| 2008/0134573 A1 | 6/2008 | Flaster | |
| 2012/0011773 A1* | 1/2012 | Cross | A01G 9/026 47/65.8 |
| 2012/0168536 A1* | 7/2012 | Downey | A01G 25/02 239/547 |
| 2014/0087616 A1* | 3/2014 | Adams | C09J 7/04 442/149 |

* cited by examiner

TREE TRUNK HOUSING AND ADJUSTABLE TARP WATER-SAVING DEVICE

BACKGROUND

Grant of Non-Exclusive Right

This application was prepared with financial support from the Saudi Arabian Cultural Mission, and in consideration therefore the present inventor(s) has granted The Kingdom of Saudi Arabia a non-exclusive right to practice the present invention.

FIELD OF THE DISCLOSURE

The present disclosure relates to a water-saving device that includes a frusto-conical housing and an adjustable tarp with a draw string for enclosing a tree trunk to prevent water evaporation and to protect the enclosed tree from environmental damage.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Plant growth is often limited by the availability of water. In dry, hot, and arid climates, water for these plants can often be difficult to come by. As water is a limited resource in many parts of the world, irrigating crops, plants, or trees can be difficult and expensive. Further adding to this problem, as the heat increases, so does the rate of evaporation, which means that less of the applied water is utilized by the plant for sustaining growth. Therefore, methods to prevent evaporation, and to protect trees from environmental elements, are critical for sustaining plant life and saving water.

Several strategies have been formed to prevent water loss from irrigation systems and to protect trees from environmental elements. Georges, J. (U.S. Pat. No. 8,296,995B1—incorporated herein by reference in its entirety) disclosed a cone-shaped housing that may be wrapped around a tree trunk to trap water and prevent unwanted evaporation.

Pattyn, E. (U.S. Pat. No. 5,878,528A—incorporated herein by reference in its entirety) disclosed a tree trunk housing to protect trees from salt, snow, wind, and other abuse.

Essafi, W. (U.S. Pat. No. 8,881,450B2—incorporated herein by reference in its entirety) describes a finable bladder that can be used to wrap a tree trunk and prevent the tree from uprooting during strong winds.

None of these strategies provide an adjustable water-saving device that protects trees as they grow in various shapes and sizes from water evaporation and other environmental conditions.

SUMMARY

According to a first aspect, the present invention relates to a water-saving device, which has i) a water resistant and hollow frusto-conical housing having a wide lower end adapted to overlie a ground surface and a narrow upper end ii) a flexible tarp in the shape of a hollow tube, wherein a lower end of the flexible tarp is integrally connected around the circumference of the narrow upper end of the housing, and the flexible tarp extends upwardly from the top of the upper end of housing iii) a first vertical cut perpendicular to the plane of the lower end of the frusto-conical housing that bisects and extends through the housing and through the attached flexible tarp, and a second vertical cut perpendicular to the plane of the lower end of the frusto-conical housing that bisects and extends through the housing and through the attached flexible tarp, wherein the second vertical cut is opposed to the first vertical cut and forms first and second housing halves and first and second flexible tarp halves connected to the housing halves iv) a first housing connector integral with the vertical cut edges of the first housing half and a second housing connector integral with the vertical cut edges of the second housing half, wherein the first and second housing connectors are releasably attached to one another to enclose a tree trunk in the hollow housing v) a first tarp connector integral with the vertical cut edges of the first tarp half and a second tarp connector integral with the vertical cut edges of the second tarp half, wherein the first and second tarp connectors are releasably attached to one another to enclose a tree trunk in the hollow tarp vi) a draw string integrally attached around the circumference of a upper end of the flexible tarp, wherein the draw string reduces the circumference of the upper end of the flexible tarp and encloses the tarp around the tree trunk.

In one embodiment, the water-saving device further includes a first row hose aperture formed in the housing, which accommodates a row hose that enters into the hollow interior of the housing, and a second row hose aperture formed in the housing, which accommodates the row hose that exits the housing.

In one embodiment, the water-saving device further incorporates a plurality of loops integrally connected around the circumference of the wide lower end of the housing, wherein the loops extend radially from the housing and lie flat on the ground surface and are staked to secure the water-saving device to the ground.

In an alternative embodiment, the water-saving device further includes a base flange integrally connected around the circumference of the wide lower end of the housing, wherein the base flange extends radially from the housing and lies flat on the ground surface and is covered with earth to secure the water-saving device.

In one embodiment, the water resistant hollow frusto-conical housing is formed of a plastic material selected from the group consisting of polyurethane, polyethylene terephthalate, polystyrene, polyvinyl chloride, and polyethylene.

In one embodiment, the flexible tarp comprises polyurethane, polyethylene, canvas, or vinyl.

In one embodiment, the water-saving device also comprises a reflective outer layer in continuous contact with the outer surface of the frusto-conical housing, the flexible tarp, or both.

In one embodiment, the flexible tarp extends upwardly from the narrow upper end of the housing by 1-6 ft.

In one embodiment, the first and second housing connectors and the first and second tarp connectors are independently selected from the group consisting of a zipper, a button, Velcro, a prong and socket, a tie string, or a buckle.

In one embodiment, the wide lower end of the housing has an interior diameter of 2-35 ft.

In one embodiment, the narrow upper end of the housing and the lower end of the flexible tarp have an interior diameter of 1-5 ft.

According to a second aspect, the present invention relates to a method of saving water with the water-saving device, in one or more of its embodiments, comprising i) enclosing a tree trunk in the frusto-conical housing by attaching the housing halves with the housing connectors ii) wrapping the tree trunk with the flexible tarp by attaching the tarp halves with the tarp connectors iii) tightening the tarp to the tree trunk by pulling the draw string iv) watering the tree, wherein the watering is prior to the enclosing, or after the tightening.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
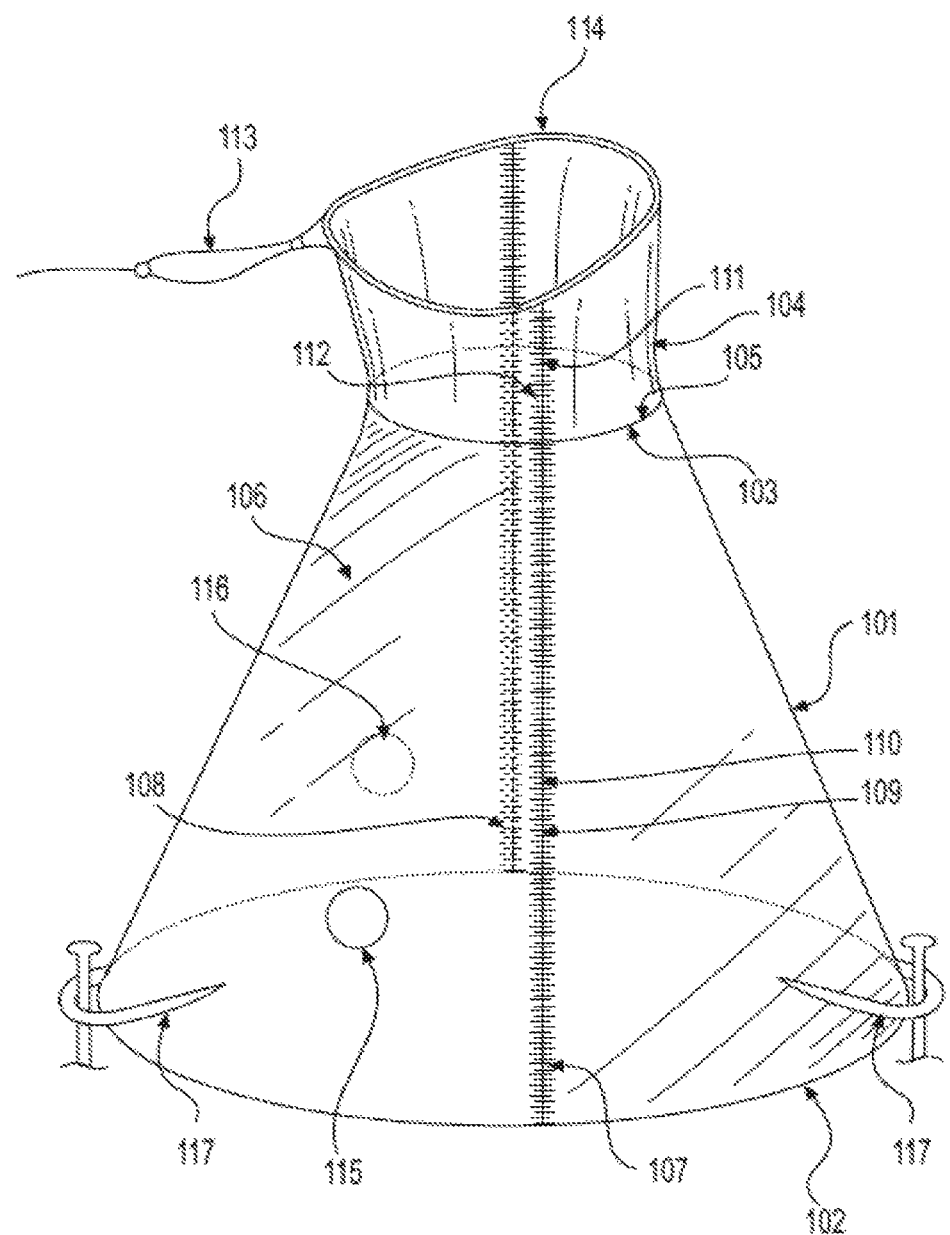
FIG. 1 is an illustration of the frusto-conical housing 101 of the water-saving device.

Referring now to the drawings, wherein like reference numerals designate identical or corresponding parts throughout the several views.

The present disclosure relates to a water-saving device that provides environmental protection to a plant. More particularly, the present invention relates a plant housing that protects a plant against environmental extremes such as cold and/or hot weather by shielding against the elements. In a hot environment, the water-saving system provides a cool area surrounding the root and trunk system of a plant, thereby preventing water evaporation. The water-saving device may be advantageously applied to plants and trees in areas with warm weather climates, little rain fall, dry air, and high winds. The water-saving device of the present invention also retains temperature from applied water, maintains optimum emitter jet position, shields against wind, protects the tree trunk and buds from animal damage, insures maximum benefits from applied water, permits use of approved herbicides and acts as a herbicide diffuser, reduces trunk sprouting and weed growth, increases growth rate with ideal conditions, prevents trunk damage due to sweating, and eliminates trunk damage from super cooling. Therefore, the present invention provides environmental regulation of the surrounding area of a plant or multiple plants with individual housings which enables the use of outside sources of energy to provide watering as required. The housing may be removable seasonally or left in place so long as it is of service to the tree.

The device of the present invention provides a housing for a tree, which prevents evaporation of applied water. Therefore, the device may reduce the amount of water needed for irrigating the plant. In turn, by reducing the amount of water needed for irrigation, the device may also cut energy costs associated with pumping water throughout an irrigation system.

Figure 2:
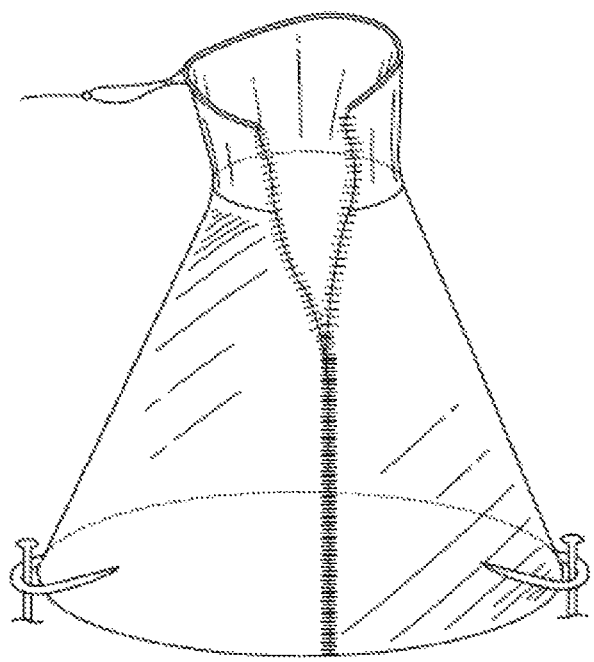
FIG. 2 is a top view illustration of the housing 101 of the water-saving device.
Figure 3:
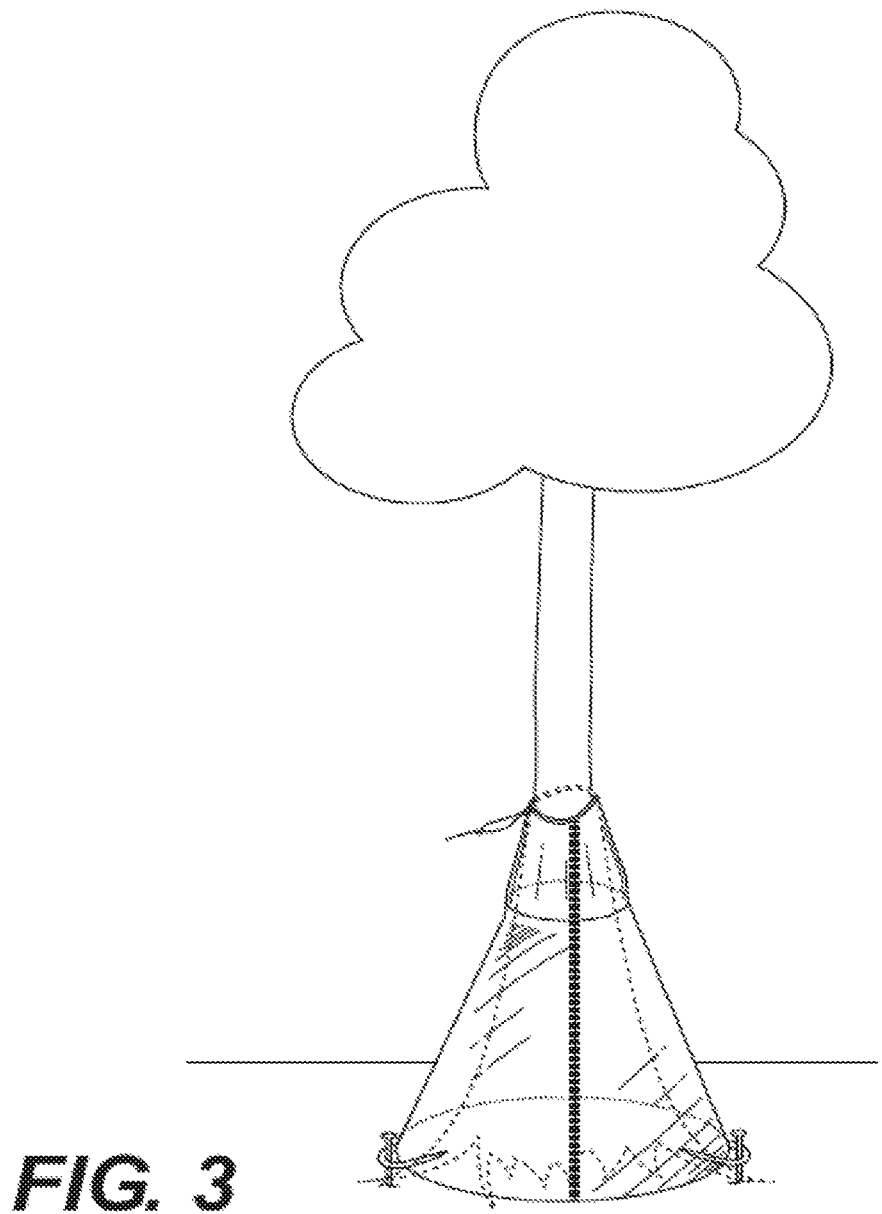
FIG. 3 is an illustration of the housing 101 of the water-saving device enclosing a tree trunk.

Referring now to FIGS. 1-3. According to a first aspect, the present invention relates to a water-saving device. The water-saving device includes a water resistant and hollow frusto-conical housing 101 having a wide lower end 102 adapted to overlie a ground surface and a narrow upper end 103.

Such a configuration is representative of a style of housing with specific characteristics which fulfill the requirements of the basic principles of the invention. However, it is intended that other forms of housing may be employed, of any design or shape which gives the specified results. Thus the housing may be a unit of any design which houses one or more plants and modifies the environmental conditions surrounding the plant so as to aid growth while protecting vital parts of the plant from environmental and foreign damage by shielding against damaging outside forces, preventing applied water evaporation, creating no adverse conditions for plant growth, providing permanent and seasonal protection, providing a protected control area for application of agricultural chemicals, and creating a shielded central area for the plant or plants enclosed by the housing. Other exemplary shapes may include, a square based pyramid, a triangular based pyramid, a triangular prism, a semi-sphere or dome shape, and the like.

The housing may be constructed of a light weight, but durable material, such as a plastic material. A plastic material is any of a wide range of synthetic or semi-synthetic organic solids that are malleable. Plastics are typically organic polymers of high molecular mass, but they often contain other substances. They are usually synthetic, most commonly derived from petrochemicals, but many are partially natural. Most plastics are imperviousness to water.

The water resistant hollow frusto-conical housing is formed of a waterproof plastic material or reinforced polymer fabric. In one embodiment, the plastic material is selected from the group consisting of polyurethane, polyethylene terephthalate, polystyrene, polyvinyl chloride, and polyethylene. Other exemplary plastics that may be used to construct the water proof housing include, but is not limited to, polyester (PES), high-density polyethylene (HDPE), polyvinylidene chloride (PVDC), low-density polyethylene (LDPE), polypropylene (PP), high impact polystyrene (HIPS), polyamides (PA) (Nylons), silnylon, acrylonitrile butadiene styrene (ABS), polyethylene/Acrylonitrile butadiene styrene (PE/ABS), polycarbonate (PC), and polycarbonate/acrylonitrile butadiene styrene (PC/ABS).

In an alternative embodiment, the housing may be made from a metal material, such as stainless steel or aluminum.

In one embodiment, the thickness of the housing material is 40-90, preferably 50-80 mm.

The housing of the present invention has two openings, a wide lower end, and a narrow upper end, and the diameter of the wide lower end is larger than the diameter of the narrow upper end.

In one embodiment, the wide lower end of the housing has an interior diameter of 1-40, preferably 1.5-37, more preferably 2-35 ft, more preferably 4-30 ft, more preferably 6-25 ft.

In one embodiment, the narrow upper end of the housing has an interior diameter of 0.5-8, preferably 0.8-6, more preferably 1-5 ft.

In one embodiment, the walls that make the frusto-conical housing have two layers, an inner layer and outer layer that forms a seal with a space existing between the two layers, such that the housing may be filled with a weighted material (water, sand, etc.). In such a scenario, a filling hole is present proximal the top of the housing that may be capped and sealed, and used to fill or drain the housing when uncapped. The fillable housing may be filled with the weighted material as a method of stabilizing and securing the housing to the tree. Further, a water-filled housing may further act as a heat guard and prevent evaporation of ground/applied water surrounding the plants roots, by providing a cool environment under the housing using the heat transfer properties of the sealed water within the walls of the housing.

The water-saving device of the present invention also includes a flexible tarp 104 in the shape of a hollow tube, wherein a lower end of the flexible tarp 105 is integrally connected around the circumference of the narrow upper end of the housing 103, and the flexible tarp extends upwardly from the top of the upper end of housing.

The flexible tarp may be formed of any flexible water proof material. In addition to the plastics mentioned heretofore, exemplary tarp materials include plain-woven fabrics such as canvas or polymeric fabrics. Polymeric fabrics such as fluoropolymeric fabrics (e.g. Gortex), and other strengthened polymeric fabrics (e.g. Tyvek, and Kevlar) and the like may also be used. In one embodiment, the flexible tarp comprises polyurethane, polyester, polyethylene, silnylon, or canvas.

In one embodiment, the lower end of the flexible tarp has the same interior diameter as the upper end of the housing, which is 0.5-8, preferably 0.8-6, more preferably 1-5 ft.

In one embodiment, the flexible tarp extends upwardly from the narrow upper end of the housing by 0.5-8, preferably 0.7-7, more preferably 1-6 ft.

When objects are placed in direct sunlight, they have a tendency to absorb heat. For example a metal object left out in the sun for several hours will become extremely hot. Such materials provide poor insulation. However, reflective materials reflect the heat back towards the source, and can act as insulators. Therefore, the area within a reflective material-wrapped enclosure will be cooler than the area inside the same enclosure lacking the reflective wrapping. With this purpose, in one embodiment of the present invention, the water-saving device also comprises a reflective outer layer 106 in continuous contact with the outer surface of the frusto-conical housing, the flexible tarp, or both. The reflective outer layer is intended to provide further protection to the roots/trunk of the surrounded tree from environmental heat and sunlight, thereby further reducing the evaporation rate of water.

Exemplary reflective materials include, but are not limited to, metal foils such as aluminum foil and tin foil, mylar, acrylic mirror, metalized plastics such as metallized polyethylene terephthalate, and polyimide films such as kapton and UPILEX.

The water-saving device of the present invention also incorporates a first vertical cut 107 perpendicular to the plane of the lower end of the frusto-conical housing that bisects and extends through the housing and through the attached flexible tarp, and a second vertical cut 108 perpendicular to the plane of the lower end of the frusto-conical housing that bisects and extends through the housing and through the attached flexible tarp, wherein the second vertical cut is opposed to the first vertical cut and forms first and second housing halves and first and second flexible tarp halves connected to the housing halves. In one embodiment, the first and second vertical cuts are diametrically opposed, or opposed by 180°, and the housing halves and the tarp halves are of equal size and shape.

Further, the water-saving device includes a first housing connector 109 integral with the vertical cut edges of the first housing half and a second housing connector 110 integral with the vertical cut edges of the second housing half, wherein the first and second housing connectors are releasably attached to one another to enclose a tree trunk in the hollow housing.

Likewise, a first tarp connector 111 integral with the vertical cut edges of the first tarp half and a second tarp connector 112 integral with the vertical cut edges of the second tarp half, wherein the first and second tarp connectors are releasably attached to one another to enclose a tree trunk in the hollow tarp.

In one embodiment, the first and second housing connectors are selected from the group consisting of a zipper, a button, Velcro, a prong and socket, a tie string, or a buckle.

In one embodiment, the first and second tarp connectors are selected from the group consisting of a zipper, a button, Velcro, a prong and socket, a tie string, or a buckle.

In terms of the present invention, a prong and socket may refer to a bayonet mount. Further, a buckle may refer to a conventional buckle (e.g. belt buckle), a snap-fit buckle, a buckle slide, or a clasp.

The housing connectors and the tarp connectors are selected such that the first and second housing connectors can be releasably attached to one another, and the first and second tarp connectors can be releasably attached to one another. Therefore, in order to attach to one another, the first and second connectors may be different genders (i.e. male or female), if applicable for the particular fastening device. For instance, if the housing connectors are Velcro, than the first housing connector may be Velcro hooks (i.e. male) and the second housing connector may be Velcro loops (i.e. female).

It is advantageous that the housing and tarp connectors be the same, e.g. both are Velcro, or both are zippers. Further, the housing connector and the tarp connector may be fluidly connected such that one connector (e.g. a zipper) may be used to connect one side of the housing and tarp together, in more or less one fluid motion. However, the housing and tarp connectors do not need to be the same. For instance the housing connectors may be connected by zippers and the tarp may be connected by Velcro.

In an alternative embodiment, rather than forming halves of the housing and tarp, the halves are joined together on one side with a hinge, and the housing/tarp may be swung open from the cut directly opposite of the hinged side to admit a tree trunk into the hollow interior of the housing/tarp. In such a case, housing connectors and tarp connecter may only be required for the side opposite of the hinge. In other words, the hinge may function as a housing connector.

In the present invention, the water-saving device also includes a draw string 113 integrally attached around the circumference of a upper end of the flexible tarp 114, wherein the draw string reduces the circumference of the upper end of the flexible tarp and encloses the tarp around the tree trunk. The flexible tarp functions by providing a more complete seal around the tree trunk and better protecting against evaporation. Further, the flexible nature of the tarp provides a better seal regardless of the diameter size of the narrow upper end of the housing. Therefore, the flexible tarp provides a one-size-fits-all solution to accommodate tree trunks of various sizes, even if the narrow upper end of the housing is too large for a particular tree trunk.

The drawstring may be used to securely fasten the tarp to the tree trunk by any conventional method. Such conventional methods include tying or knotting both ends of the draw string together in the taught position, or using a cord lock/cord fastener to tighten the draw string and to prevent untightening of the draw string.

In one embodiment, the water-saving device further includes a first row hose aperture 115 formed in the housing, which accommodates a row hose that enters into the hollow interior of the housing, and a second row hose aperture 116 formed in the housing, which accommodates a row hose that exits the housing.

In one embodiment, the water-saving device has a plurality of row hose apertures. The plurality of row hose apertures may be at a variety of vertically and horizontally separated levels. It is envisaged that the row hose apertures are spread around the circumference of the housing to best spread the application of water around the entire root system of the enclosed tree. This may be particularly important for trees with wide root systems, where water applied to only one side of the housing may provide insufficient watering. The row hose apertures may be circumferentially spaced apart in relation to one another. The first and second row hose apertures may be located in an offset relation to a diameter of the housing.

A water atomizer may be used to water the enclosed plant or tree, but is not a limiting feature of the present invention. The water-saving device of the present invention is suited to harbor a water atomizer within the hollow inner space within the housing. The water atomizer may be mounted to the interior of the housing, or alternatively, mounted to the ground within the interior of the housing. The water atomizer may be a shrub head sprayer nozzle, or a jet spray nozzle, or a fog head. The water atomizer may spray in multiple vertically or horizontally oriented directions. Further the water atomizer may also rotate in a full circle (i.e. 360°) or a semi-circle (e.g. 180°). One purpose of the water-saving device is to capture the spray from the water atomizer, regardless of the direction of spray, and to allow the applied water to reach the root system of the enclosed tree.

Water is supplied to the interior of the housing at a rate of 5-30 gallons per hour, at a pressure of 10-25 psi, in keeping with conventional low volume spray irrigation.

In one embodiment, the water atomizer is directly attached to, or part of the row hose. Alternatively, the water atomizer may be attached to, or part of a conduit that is fluidly connected to the row hose, such that water is supplied to the water atomizer from the row hose and through the conduit.

In one embodiment, the water-saving device further incorporates a plurality of loops 117 integrally connected around the circumference of the wide lower end of the housing, wherein the loops extend radially from the housing and lie flat on the ground surface and are staked to secure the water-saving device to the ground.

In an alternative embodiment, the water-saving device further includes a base flange integrally connected around the circumference of the wide lower end of the housing, wherein the base flange extends radially from the housing and lies flat on the ground surface and is covered with earth to secure the water-saving device. In a preferred embodiment, the base flange extends from the wide lower end of the housing by more than 5 inches, but that dimension is not critical.

It is envisaged that the wide lower end of the housing is wide enough to cover much of the root systems of trees with various sizes for the most advantageous application of the water-saving device. A date palm tree is an example of a tree with a wide root system, which has roots that extend away from the trunk on average by 6-13 ft. Therefore, it would be advantageous for the water-saving device to cover much of the roots of a full grown tree, even those with a wide root system.

Further, it is envisioned that the water-saving device, in one or more of its embodiments, can accommodate tree trunks of various sizes, due to a large upper diameter of the housing. The present invention enables a housing with an upper diameter that is too large and loosely fitting for a smaller sized tree trunk to still function as intended, due to the adjustable tarp that effectively seals the water-saving device to the trunk of the tree. Therefore, it may be possible to use a water-saving device of one size on one tree, even as the tree grows, whereby a loose fitting housing is still sealed to the small tree trunk of a young tree, and as the tree grows the tarp is easily expandable to accommodate the growing trunk diameter. Further, once the tree is fully grown, the wide lower end of the housing is wide enough to cover most of the fully grown root system.

Besides accommodating growing trees with changing trunk sizes and root system sizes, the water-saving device of the present invention may also fit tree trunks that do not grow in substantially vertical directions. For instance, many palm trees have irregular or bent growth patterns where the tree trunks emerge from the soil with sharp angles where the tree trunk is nearly parallel to the ground. The flexible nature of the tarp allows for the water-saving device of the present invention to accept tree trunks with various shapes and growth patterns, while the housing lays flat on the ground surface for the best water-saving benefit.

According to a second aspect, the present invention relates to a method of saving water with the water-saving device, in one or more of its embodiments, comprising i) enclosing a tree trunk in the frusto-conical housing by attaching the housing halves with the housing connectors ii) wrapping the tree trunk with the flexible tarp by attaching the tarp halves with the tarp connectors iii) tightening the tarp to the tree trunk by pulling the draw string iv) watering the tree, wherein the watering is prior to the enclosing, or after the tightening.

In one embodiment, the watering takes place after the tightening, and the tree is watered through the row hose apertures using a row hose. Alternatively, the tree may be watered through the row hose apertures with a regular garden hose.

In one embodiment, the tree may be watered through the top of frusto-conical housing prior to the tightening.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A water-saving device, comprising:
    a water resistant and hollow frusto-conical housing formed from a metal material having a wide lower end adapted to overlie a ground surface and a narrow upper end;
    a flexible tarp in the shape of a hollow tube, wherein a lower end of the flexible tarp is integrally connected around the circumference of the narrow upper end of the housing, and the flexible tarp extends upwardly from the top of the upper end of housing;

a first vertical cut perpendicular to the plane of the lower end of the frusto-conical housing that bisects and extends through the housing and through the attached flexible tarp, and a second vertical cut perpendicular to the plane of the lower end of the frusto-conical housing that bisects and extends through the housing and through the attached flexible tarp, wherein the second vertical cut is opposed to the first vertical cut and forms first and second housing halves and first and second flexible tarp halves connected to the housing halves;

a first housing connector integral with the vertical cut edges of the first housing half and a second housing connector integral with the vertical cut edges of the second housing half, wherein the first and second housing connectors are releasably attached to one another to enclose a tree trunk in the hollow housing;

a first tarp connector integral with the vertical cut edges of the first tarp half and a second tarp connector integral with the vertical cut edges of the second tarp half, wherein the first and second tarp connectors are releasably attached to one another to enclose a tree trunk in the hollow tarp;

a draw string integrally attached around the circumference of an upper end of the flexible tarp, wherein the draw string reduces the circumference of the upper end of the flexible tarp and encloses the tarp around the tree trunk.

2. The water-saving device of claim 1, further comprising a first row hose aperture formed in the housing, which is configured to accommodate a row hose that enters into the hollow interior of the housing and a second row hose aperture formed in the housing, which is configured to accommodate a row hose that exits the housing.

3. The water-saving device of claim 1, further comprising a plurality of loops integrally connected around the circumference of the wide lower end of the housing, wherein the loops extend radially from the housing and lie flat on the ground surface and are staked to secure the water-saving device to the ground.

4. The water-saving device of claim 1, further comprising a base flange integrally connected around the circumference of the wide lower end of the housing, wherein the base flange extends radially from the housing and lies flat on the ground surface and is covered with earth to secure the water-saving device.

5. The water-saving device of claim 1, wherein the water resistant hollow frusto-conical housing is formed of a plastic material selected from the group consisting of polyurethane, polyethylene terephthalate, polystyrene, polyvinyl chloride, and polyethylene.

6. The water-saving device of claim 1, wherein the flexible tarp comprises polyurethane, polyethylene, canvas, or vinyl.

7. The water-saving device of claim 1, further comprising a reflective outer layer in continuous contact with the outer surface of the frusto-conical housing, the flexible tarp, or both.

8. The water-saving device of claim 1, wherein the flexible tarp extends upwardly from the narrow upper end of the housing by 1-6 ft.

9. The water-saving device of claim 1, wherein the first and second housing connectors and the first and second tarp connectors are independently selected from the group consisting of a zipper, a button, a hook and loop connector, a prong and socket, a tie string, or a buckle.

10. The water-saving device of claim 1, wherein the wide lower end of the housing has an interior diameter of 2-35 ft.

11. The water-saving device of claim 1, wherein the narrow upper end of the housing and the lower end of the flexible tarp have an interior diameter of 1-5 ft.

12. A method of saving water with the water-saving device of claim 1, comprising:

enclosing a tree trunk in the frusto-conical housing by attaching the housing halves with the housing connectors;

wrapping the tree trunk with the flexible tarp by attaching the tarp halves with the tarp connectors;

tightening the tarp to the tree trunk by pulling the draw string;

watering the tree, wherein the watering is prior to the enclosing, or after the tightening.

13. The water-saving device of claim 1, wherein the water resistant hollow frusto-conical housing is formed of a plastic material selected from the group consisting of polyvinylidene chloride, polypropylene, high impact polystyrene, a polyamide, acrylonitrile butadiene styrene, polycarbonate, and polycarbonate/acrylonitrile butadiene styrene.

14. The water-saving device of claim 1, wherein the metal material comprises stainless steel or aluminum.

15. The water-saving device of claim 1, wherein the flexible tarp comprises a fluoropolymeric fabric.

16. The water-saving device of claim 7, wherein the reflective outer layer is aluminum foil, acrylic mirror, metallized polyethylene terephthalate, or a polyimide film.

17. The water-saving device of claim 1, wherein the first and second tarp connectors are selected from the group consisting of a zipper, a button, a hook and loop connector, a prong and socket, or a buckle.

18. The water-saving device of claim 1, wherein both the first and second housing connectors and the first and second tarp connectors are a zipper.

* * * * *